United States Patent
Nakajima

(10) Patent No.: US 6,633,303 B2
(45) Date of Patent: Oct. 14, 2003

(54) METHOD, SYSTEM AND RECORD MEDIUM FOR GENERATING WIDE-AREA HIGH-RESOLUTION IMAGE

(75) Inventor: Noboru Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 302 days.

(21) Appl. No.: 09/849,531

(22) Filed: May 7, 2001

(65) Prior Publication Data

US 2001/0043229 A1 Nov. 22, 2001

(30) Foreign Application Priority Data

May 10, 2000 (JP) ........................................ 2000-142299

(51) Int. Cl.⁷ ................................................. G09G 5/00
(52) U.S. Cl. ........................ 345/629; 345/634; 345/788
(58) Field of Search .................................. 345/629, 634, 345/635, 636, 781, 788; 707/526, 500, 500.1, 501.1; 382/173, 299

(56) References Cited

U.S. PATENT DOCUMENTS

| | | | | |
|---|---|---|---|---|
| 5,893,127 A | * | 4/1999 | Tyan et al. | 707/513 |
| 6,057,842 A | * | 5/2000 | Knowlton et al. | 345/788 |
| 6,226,407 B1 | * | 5/2001 | Zabih et al. | 382/209 |
| 6,545,687 B2 | * | 4/2003 | Scott et al. | 345/629 |

FOREIGN PATENT DOCUMENTS

JP         10-210272         8/1998

OTHER PUBLICATIONS

Nakajima et al., "Document Reconstruction and Recognition from an Image Sequence", *Proceedings 14th International Conference on Pattern Recognition (IAPR (International Association for Pattern Recognition))*, vol. 1, 1998, pp. 922–925.

Nakajima et al., "Document Layout and Reading Sequence Analysis by Extended Split Detection Method", *Proceedings IAPR (International Association for Pattern Recognition)*, Workshop on Document Analysis Systems, 1998, pp. 406–415.

* cited by examiner

*Primary Examiner*—Matthew Luu
(74) *Attorney, Agent, or Firm*—Sughrue Mion, PLLC

(57) ABSTRACT

A capture device 3 first captures the whole of a document 2 and thereby obtains a total image of the document 2. A structure analysis section 24 conducts image structure analysis to the total image, and thereby extracts structural elements (text, figure, picture, etc.) of the document 2 and obtains position information of the structural elements. For each of one or more selected structural elements, a sub-image acquisition process is conducted, in which a control information generation section 25 determines one or more partial areas and a resolution to be used for capturing the selected structural element and an image acquisition control section 23 acquires sub-images of the partial areas of the structural element by use of the capture device 3 with the determined resolution. An image connection section 26 connects the sub-images together and thereby obtains a high resolution image (synthesis target image) of the structural element. For each of the other (not selected) structural elements to which the sub-image acquisition process has not been conducted, part of the total image corresponding to the structural element is extracted as a synthesis target image. An image reconstruction section 28 synthesizes the synthesis target images of the structural elements maintaining relative position relationship between the structural elements, thereby a wide-area high-resolution image of the document 2 is obtained even if relatively large blank areas existed in the document 2.

30 Claims, 8 Drawing Sheets

FIG. 3

Document Reconstruction and Recognition

Abstract: A new method for reconstructing a document from an image sequence and recognizing contents of the document is described. In this method, frame images in the image sequence are acquired as partial sub-images by a moving camera.

1. Introduction

Document OCRs have been developed for digitizing documents into character code sequences. As their accuracy increases, new applications are required. Examples of document OCR applications include keyword recognition.

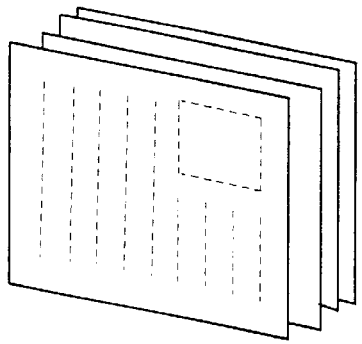

Fig.1 Document

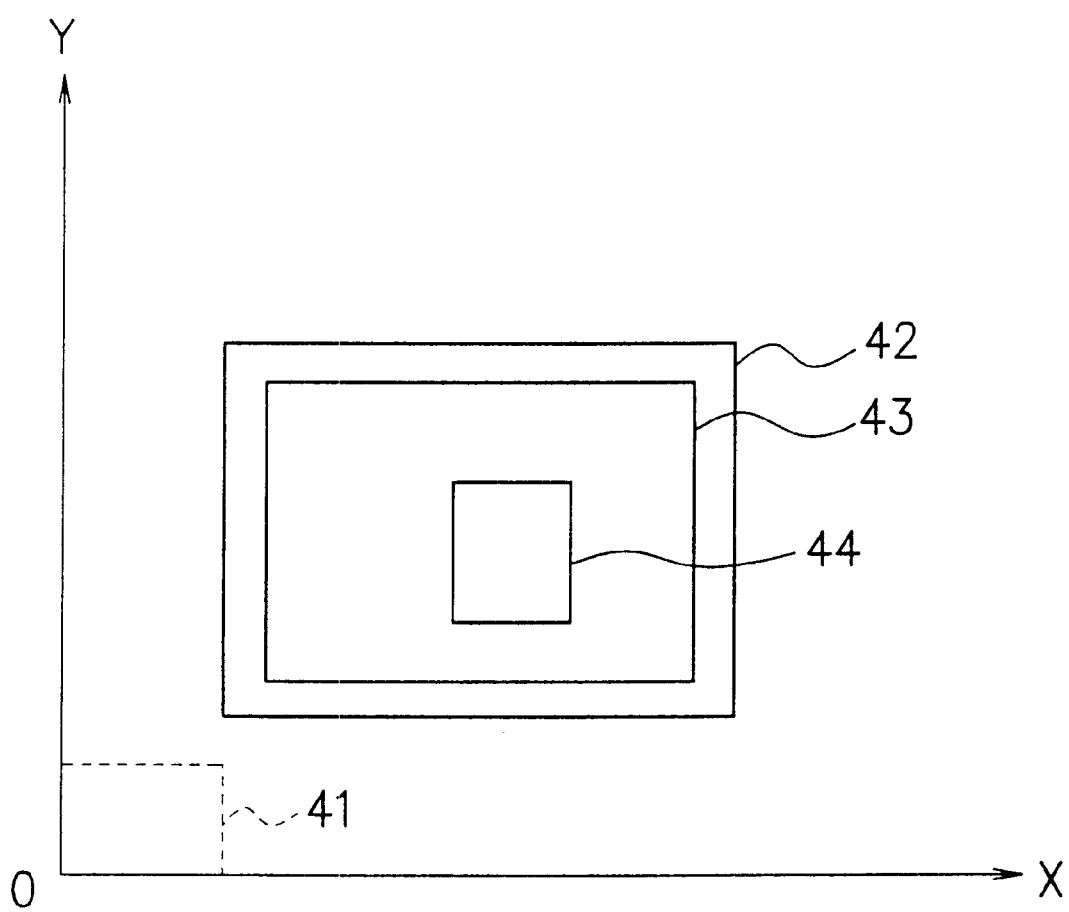

FIG. 7

| |
|---|
| STRUCTURAL ELEMENT 51 |
| ZOOM RATIO |
| CAPTURING DIRECTION FOR PARTIAL AREA #1 |
| ⋮ |
| CAPTURING DIRECTION FOR PARTIAL AREA #m |
| STRUCTURAL ELEMENT 52 |
| ZOOM RATIO |
| CAPTURING DIRECTION FOR PARTIAL AREA #1 |
| ⋮ |
| CAPTURING DIRECTION FOR PARTIAL AREA #n |
| STRUCTURAL ELEMENT 53 |
| ZOOM RATIO |
| CAPTURING DIRECTION FOR PARTIAL AREA #1 |
| ⋮ |
| CAPTURING DIRECTION FOR PARTIAL AREA #p |
| STRUCTURAL ELEMENT 55 |
| ZOOM RATIO |
| CAPTURING DIRECTION FOR PARTIAL AREA #1 |
| ⋮ |
| CAPTURING DIRECTION FOR PARTIAL AREA #q |

METHOD, SYSTEM AND RECORD MEDIUM FOR GENERATING WIDE-AREA HIGH-RESOLUTION IMAGE

BACKGROUND OF THE INVENTION

The present invention relates to a system and method for generating a wide-area high-resolution image by capturing partial images (sub-images) of parts of a target object such as a document and thereafter connecting or synthesizing the sub-images.

Description of the Related Art

When a document of a large size is captured and inputted as image data by use of a capture device (video camera etc.) in a high resolution that is suitable for character recognition, the document is generally segmented into parts and the segmented parts are captured individually by the capture device to be synthesized or connected later. An example of such a conventional wide-area high-resolution image generation method has been disclosed in Japanese Patent Application Laid-Open No. HEI10-210272 (hereafter, referred to as "document No. 1"). In the conventional technique of the document No. 1, a wide-area high-resolution image is obtained as described below.

First, the whole of a document (the target object of capturing) is preliminarily captured by a camera and thereby an image of the whole of the document (hereafter, referred to as a "total image") is obtained. Subsequently, the number of sub-images (images of parts of the document) necessary for covering the whole of the document with a predetermined resolution is determined and thereby a zoom ratio (power) to be used for capturing the sub-images is determined. Subsequently, each part of the document (including the periphery (margin) of the part) is successively captured by the camera with the zoom ratio determined above, and thereby sub-images of the parts of the document are obtained. Subsequently, adjoining sub-images are successively connected together by use of image information (pixel intensity, structure such as lines, etc.) and thereby a wide-area high-resolution image of the whole of the document is generated.

A method which is similar to the wide-area high-resolution image generation method of the document No. 1 has been disclosed in a document: Noboru Nakajima, Naoya Tanaka and Keiji Yamada "Document Reconstruction and Recognition from an Image Sequence," Proceedings 14th International Conference on Pattern Recognition (IAPR (International Association for Pattern Recognition)), Vol. 1 pp. 922–925 (1998) (hereafter, referred to as "document No. 2). In the method of the document No. 2, the connection of the adjoining high-resolution sub-images is conducted at small calculation cost, by executing structure analysis to each sub-image and using structure information (hierarchical layout structure such as, characters, character strings, text blocks (paragraphs), columns, etc.) of the sub-images.

However, the conventional wide-area high-resolution image generation methods which have been described above involves the following problems or drawbacks. First, if a document having some large blank areas is segmented into parts and sub-images are obtained by capturing parts of the document, some of the sub-images might be totally blank or might be images having blank margins. In such cases, the connection of the adjoining sub-images and the generation of the wide-area high-resolution image become impossible since the connecting margins of such sub-images do not have structure information (lines, characters, etc.) to be used for the registration. Therefore, the conventional methods are not capable of generating a wide-area high-resolution image when a relatively large blank area exists in the document or in the originally captured total image.

Further, the two adjoining sub-images to be connected together are generally required to have the same resolution. Therefore, in the conventional methods (which successively connect adjoining sub-images for obtaining the wide-area high-resolution image), all the sub-images have to be captured in the same resolution. If a document to be captured includes a short text or character string that has to be captured in a high resolution for character recognition etc., the whole of the document has to be segmented into a lot of small parts according to the required high resolution and all the parts have to be captured in the same high resolution, taking an enormous processing time.

SUMMARY OF THE INVENTION

It is therefore the primary object of the present invention to provide a system and method for generating a wide-area high-resolution image, by which the wide-area high-resolution image can successfully be generated even if a relatively large blank area existed in the document to be captured or in the originally captured total image.

Another object of the present invention is to provide a system and method for generating a wide-area high-resolution image, by which the wide-area high-resolution image can be generated by use of images of different resolutions.

Another object of the present invention is to provide a system and method for generating a wide-area high-resolution image, which can decrease the number of necessary sub-images and shorten the processing time when one or more areas (such as blank areas) that do not require high resolution capturing existed in the originally captured total image.

In accordance with a first aspect of the present invention, there is provided a wide-area high-resolution image generation method comprising a total image acquisition step, an image structure analysis step, a sub-image acquisition step, an image connection step, an image extraction step and a wide-area high-resolution image generation step. In the total image acquisition step, a target object of the generation of a wide-area high-resolution image is captured by a capture device and thereby a total image of the target object is acquired. In the image structure analysis step, image structure analysis is conducted to the total image of the target object and thereby structural elements are extracted from the total image and position information of each structural element is obtained. The sub-image acquisition step is conducted for one or more of the structural elements. In the sub-image acquisition step, one or more partial areas and a resolution to be used for capturing the structural element are determined and sub-images of the partial areas of the structural element are acquired by the capture device with the determined resolution. The image connection step is conducted for each of the structural elements to which the sub-image acquisition step has been conducted. In the image connection step, the sub-images of the partial areas of the structural element are connected together by use of image information of the sub-images and thereby an image of the structural element having the determined resolution is obtained as a synthesis target image. The image extraction step is conducted for each of the structural elements to which the sub-image acquisition step has not been conducted. In the image extraction step, part of the total image corresponding to the structural element is extracted from the total image as a synthesis target image. In the wide-area high-resolution image generation step, the synthesis target images of the structural elements obtained in the image connection steps and the image extraction steps are synthesized so that relative position relationship of the synthesis target images will be the same as that of the structural elements in the total image of the target object based on the position information of the structural elements obtained in the image structure analysis step and thereby a wide-area high-resolution image of the target object is obtained.

In accordance with a second aspect of the present invention, in the first aspect, the wide-area high-resolution image generation method further comprises an attribute determination step. In the attribute determination step, the attribute of each structural element is determined based on the image structure analysis. The sub-image acquisition step is conducted for structural elements having attributes that require higher resolution than that of the total image.

In accordance with a third aspect of the present invention, in the second aspect, the wide-area high-resolution image generation method further comprises a resolution judgment step. The resolution judgment step is conducted for each of the structural elements to which the sub-image acquisition step has been conducted. In the resolution judgment step, whether or not a sufficient resolution predetermined for the attribute of the structural element could be attained is judged. For each of the structural elements that have been judged to have insufficient resolution in the resolution judgment step, the sub-image acquisition step is repeated with a higher resolution and new partial areas until the sufficient resolution predetermined for the attribute is attained. The image connection step for the structural element is conducted by use of the sub-images which attained the sufficient resolution.

In accordance with a fourth aspect of the present invention, in the resolution judgment step in the third aspect, one or more fine structural elements are extracted from the sub-images of the structural element and the judgment on the resolution is executed based on pixel density of the extracted fine structural elements.

In accordance with a fifth aspect of the present invention, in the fourth aspect, one or more letters are extracted as the fine structural elements in the resolution judgment step.

In accordance with a sixth aspect of the present invention, in the first aspect, the wide-area high-resolution image generation method further comprises a geometrical deformation estimation step and a geometrical deformation compensation step. In the geometrical deformation estimation step, geometrical deformation is estimated between every two adjoining sub-images of a structural element and thereby geometrical deformation of each sub-image of the structural element is estimated. In the geometrical deformation compensation step, the geometrical deformation of each sub-image of the structural element is compensated for based on the geometrical deformation estimated in the geometrical deformation estimation step and thereby deformation-compensated sub-images of the structural element are obtained to be used in the image connection step.

In accordance with a seventh aspect of the present invention, in the geometrical deformation estimation step in the sixth aspect, the estimation of the geometrical deformation between two adjoining sub-images is conducted using one or more fine structural elements extracted from the two adjoining sub-images.

In accordance with an eighth aspect of the present invention, in the seventh aspect, one or more letters extracted from the two adjoining sub-images are used as the fine structural elements in the geometrical deformation estimation step.

In accordance with a ninth aspect of the present invention, in the seventh aspect, the estimation of the geometrical deformation between the two adjoining sub-images in the geometrical deformation estimation step is conducted by estimating geometrical deformation of each of one or more fine structural elements between the two adjoining sub-images individually and taking the average of the geometrical deformations of the fine structural elements.

In accordance with a tenth aspect of the present invention, in the fourth aspect, the wide-area high-resolution image generation method further comprises a geometrical deformation estimation step and a geometrical deformation compensation step. In the geometrical deformation estimation step, geometrical deformation is estimated between every two adjoining sub-images of a structural element and thereby geometrical deformation of each sub-image of the structural element is estimated. In the geometrical deformation compensation step, the geometrical deformation of each sub-image of the structural element is compensated for based on the geometrical deformation estimated in the geometrical deformation estimation step and thereby deformation-compensated sub-images of the structural element are obtained to be used in the image connection step. In the geometrical deformation estimation step, the estimation of the geometrical deformation between two adjoining sub-images is conducted using the fine structural elements extracted in the resolution judgment step.

In accordance with an eleventh aspect of the present invention, there is provided a wide-area high-resolution image generation system comprising a processing device which is connected to a capture device whose capturing direction and zoom ratio are controllable. The processing device includes a total image acquisition means, an image structure analysis means, a sub-image acquisition means, an image connection means, an image extraction means and a wide-area high-resolution image generation means. The total image acquisition means captures a target object of the generation of a wide-area high-resolution image by use of the capture device and thereby acquires a total image of the target object. The image structure analysis means conducts image structure analysis to the total image of the target object, and thereby extracts structural elements from the total image and obtains position information of each structural element. The sub-image acquisition means conducts a sub-image acquisition process for one or more of the structural elements. In the sub-image acquisition process, one or more partial areas and a resolution to be used for capturing the structural element are determined and sub-images of the partial areas of the structural element are acquired by the capture device with the determined resolution. The image connection means conducts an image connection process for each of the structural elements to which the sub-image acquisition process has been conducted. In the image connection process, the sub-images of the partial areas of the structural element are connected together by use of image information of the sub-images and thereby an image of the structural element having the determined resolution is obtained as a synthesis target image. The image extraction means conducts an image extraction process for each of the structural elements to which the sub-image acquisition process has not been conducted. In the image extraction process, part of the total image corresponding to the structural element is extracted from the total image as a synthesis target image. The wide-area high-resolution image generation means synthesizes the synthesis target images of the structural elements obtained in the image connection process and the image extraction process so that relative position relationship of the synthesis target images will be the same as that of the structural elements in the total image of the target object based on the position information of the structural elements obtained by the image structure analysis means, and thereby obtains a wide-area high-resolution image of the target object.

In accordance with a twelfth aspect of the present invention, in the eleventh aspect, the processing device further includes an attribute determination means for determining the attribute of each structural element based on the image structure analysis conducted by the image structure analysis means. The sub-image acquisition means conducts the sub-image acquisition process for structural elements having attributes that require higher resolution than that of the total image.

In accordance with a thirteenth aspect of the present invention, in the twelfth aspect, the processing device further includes a resolution judgment means which conducts a resolution judgment process for each of the structural elements to which the sub-image acquisition process has been conducted. In the resolution judgment process, whether or not a sufficient resolution predetermined for the attribute of the structural element could be attained is judged. For each of the structural elements that have been judged to have insufficient resolution in the resolution judgment process, the sub-image acquisition means repeats the sub-image acquisition process with a higher resolution and new partial areas until the sufficient resolution predetermined for the attribute is attained. The image connection means conducts the image connection process for the structural element by use of the sub-images which attained the sufficient resolution.

In accordance with a fourteenth aspect of the present invention, in the thirteenth aspect, the resolution judgment means extracts one or more fine structural elements from the sub-images of the structural element and executes the judgment on the resolution based on pixel density of the extracted fine structural elements.

In accordance with a fifteenth aspect of the present invention, in the fourteenth aspect, the resolution judgment means extracts one or more letters as the fine structural elements.

In accordance with a sixteenth aspect of the present invention, in the eleventh aspect, the processing device further includes a geometrical deformation estimation means and a geometrical deformation compensation means. The geometrical deformation estimation means estimates geometrical deformation between every two adjoining sub-images of a structural element and thereby estimates geometrical deformation of each sub-image of the structural element. The geometrical deformation compensation means compensates for the geometrical deformation of each sub-image of the structural element based on the geometrical deformation estimated by the geometrical deformation estimation means, and thereby obtains deformation-compensated sub-images of the structural element to be used in the image connection process.

In accordance with a seventeenth aspect of the present invention, in the sixteenth aspect, the geometrical deformation estimation means conducts the estimation of the geometrical deformation between two adjoining sub-images using one or more fine structural elements extracted from the two adjoining sub-images.

In accordance with an eighteenth aspect of the present invention, in the seventeenth aspect, the geometrical deformation estimation means uses one or more letters extracted from the two adjoining sub-images as the fine structural elements.

In accordance with a nineteenth aspect of the present invention, in the seventeenth aspect, the geometrical deformation estimation means conducts the estimation of the geometrical deformation between the two adjoining sub-images by estimating geometrical deformation of each of one or more fine structural elements between the two adjoining sub-images individually and taking the average of the geometrical deformations of the fine structural elements.

In accordance with a twentieth aspect of the present invention, in the fourteenth aspect, the processing device further includes a geometrical deformation estimation means and a geometrical deformation compensation means. The geometrical deformation estimation means estimates geometrical deformation between every two adjoining sub-images of a structural element and thereby estimates geometrical deformation of each sub-image of the structural element. The geometrical deformation compensation means compensates for the geometrical deformation of each sub-image of the structural element based on the geometrical deformation estimated by the geometrical deformation estimation means, and thereby obtains deformation-compensated sub-images of the structural element to be used in the image connection process. The geometrical deformation estimation means conducts the estimation of the geometrical deformation between two adjoining sub-images using the fine structural elements extracted by the resolution judgment means.

In accordance with twenty-first through thirtieth aspects of the present invention, there are provided machine-readable record mediums storing programs for instructing a computer, a DSP (Digital Signal Processor), etc. to execute the wide-area high-resolution image generation methods of the first through tenth aspects of the present invention.

BRIEF DESCRIPTION OF THE DRAWINGS

The objects and features of the present invention will become more apparent from the consideration of the following detailed description taken in conjunction with the accompanying drawings, in which:

FIG. 3 is a schematic diagram showing a simple example of a total image of a document which is acquired by a total image acquisition step in the flow chart of FIG. 2;

FIG. 4 is a schematic diagram showing an example of the definition of position information of a structural element;

FIG. 7 is a table showing an example of the contents of control information which is generated by the control information generation section.

DESCRIPTION OF THE PREFERRED EMBODIMENTS

Figure 1:
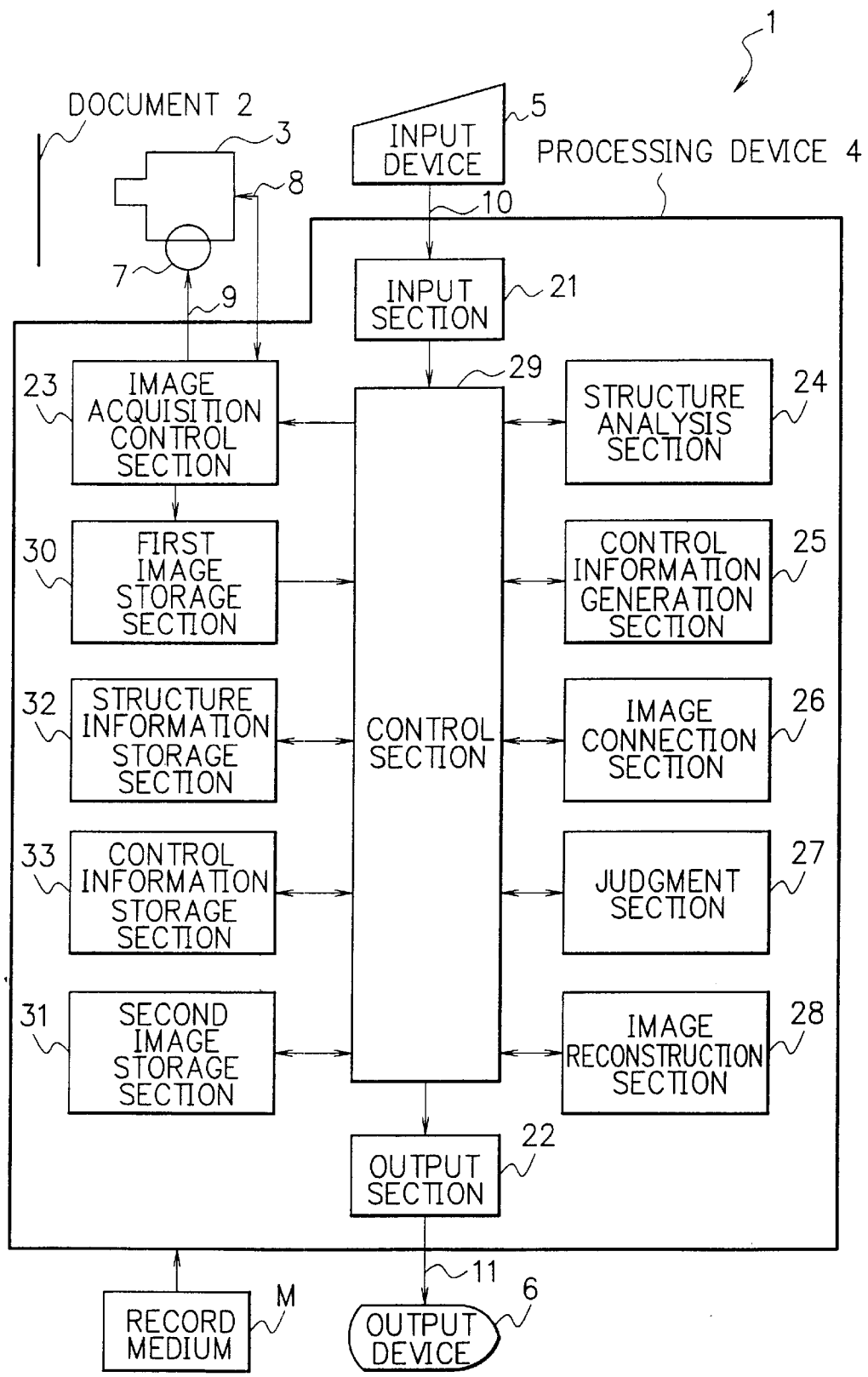
FIG. 1 is a block diagram showing a wide-area high-resolution image generation system in accordance with a first embodiment of the present invention.

Referring now to the drawings, a description will be given in detail of preferred embodiments in accordance with the present invention.

[Embodiment 1]

FIG. 1 is a block diagram showing a wide-area high-resolution image generation system in accordance with a first embodiment of the present invention. The wide-area high-resolution image generation system 1 shown in FIG. 1 includes a capture device 3 for capturing a document 2 (the target object of the wide-area high-resolution image), a processing device 4 for controlling the capture device 3 and processing image data which are obtained by the capture device 3, an input device 5 including a keyboard etc., and an output device 6 such as a display, printer, etc.

The capture device 3 is implemented by a camera such as an active camera or a pan-tilt-zoom camera whose zoom ratio (power) is controlled by a control signal which is supplied from the processing device 4. The capture device 3 is attached to a mechanical mount 7 and is held so as to face the document 2 which is placed on a desk, for example. The mechanical mount 7 is capable of rotating the capture device 3 around two orthogonal horizontal axes (x-axis and y-axis). The capturing direction of the capture device 3 is expressed by a displacement angle θx from the x-axis and a displacement angle θy from the y-axis. While the mechanical mount 7 of this embodiment rotates the capture device 3 in order to cover the whole of the document, it is also possible to employ another type of a mechanical mount that translates the capture device 3 above the document 2 on the desk.

The processing device 4 is connected to the capture device 3, the mechanical mount 7, the input device 5 and the output device 6 via signal lines 8, 9, 10 and 11, respectively. The processing device 4 obtains images of the document 2 controlling the capturing position (capturing direction) and the zoom ratio of the capture device 3 by manipulating the mechanical mount 7 and the capture device 3, generates a wide-area high-resolution image of the document 2 by use of the obtained images, and outputs the generated wide-area high-resolution image to the output device 6. The processing device 4 shown in FIG. 1 includes an input section 21, an output section 22, an image acquisition control section 23, a structure analysis section 24, a control information generation section 25, an image connection section 26, a judgment section 27, an image reconstruction section 28, a control section 29, a first image storage section 30, a second image storage section 31, a structure information storage section 32 and a control information storage section 33.

The processing device 4 can be implemented by, for example, a computer (personal computer etc.) and a machine-readable record medium (CD-ROM, semiconductor memory, magnetic disk, etc). In such cases, a wide-area high-resolution image generation program which has been stored in the record medium M is read out by the computer and controls the operation of the computer, thereby a function section (the input section 21, the output section 22, the image acquisition control section 23, the structure analysis section 24, the control information generation section 25, the image connection section 26, the judgment section 27, the image reconstruction section 28 and the control section 29) and a storage section (the first image storage section 30, the second image storage section 31, the structure information storage section 32 and the control information storage section 33) of the processing device 4 are implemented on the computer.

Figure 2:
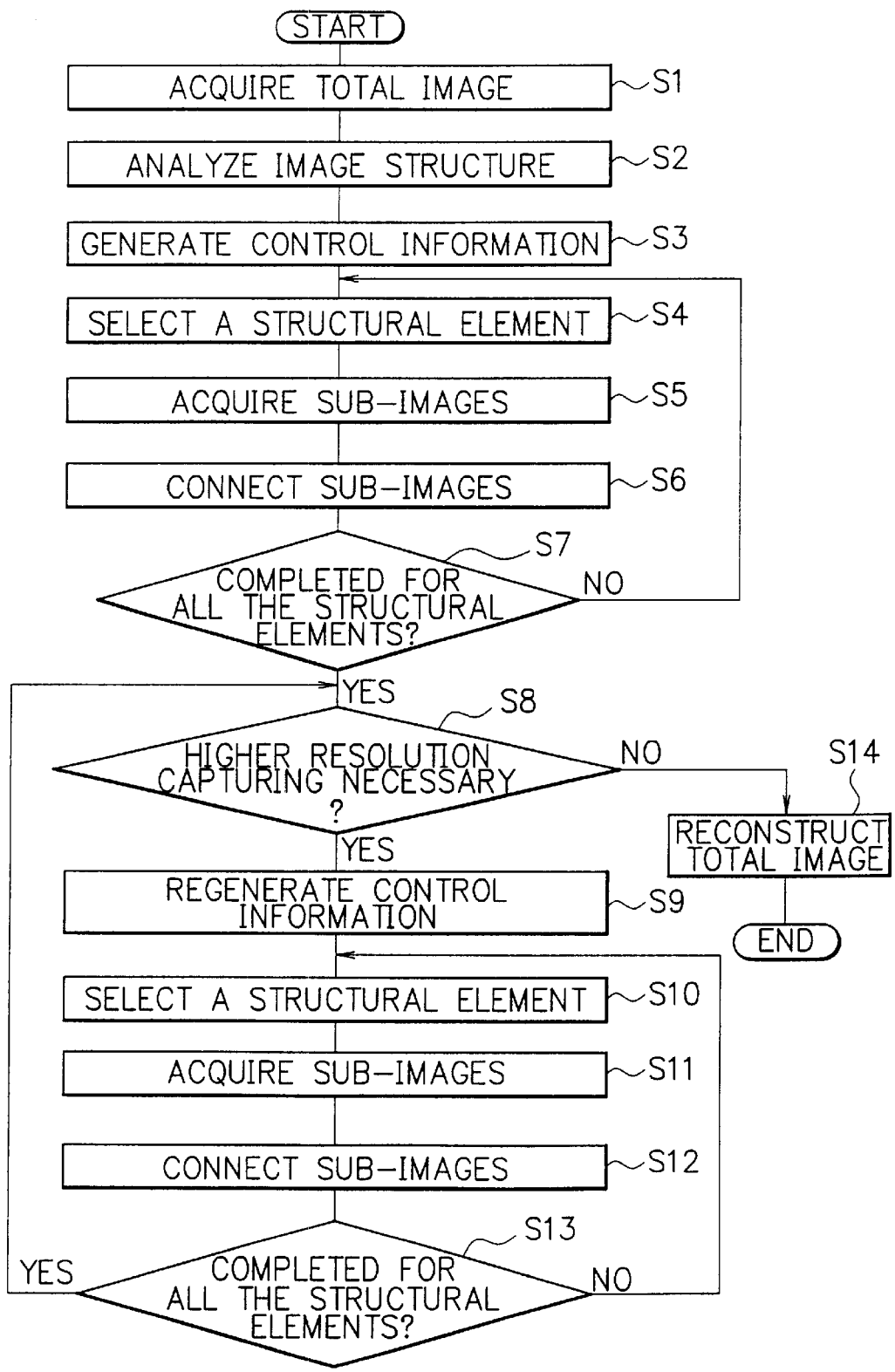
FIG. 2 is a flow chart showing an example of the operation of a processing device of the wide-area high-resolution image generation system of FIG. 1.

In the following, the operation of the wide-area high-resolution image generation system in accordance with the first embodiment of the present invention will be described in detail referring to figures. FIG. 2 is a flow chart showing an example of the operation of the processing device 4.

<Step S1: Acquire Total Image>

The wide-area high-resolution image generation process is started when an instruction for starting image capturing is inputted by the user from the input device 5. The control section 29 which received the image capturing instruction from the input device 5 via the input section 21 instructs the image acquisition control section 23 to acquire a total image of the document 2. The image acquisition control section 23 which received the instruction sends a control signal to the mechanical mount 7 via the signal line 9 in order to adjust the capturing direction of the capture device 3, and sends another control signal to the capture device 3 via the signal line 8 in order to adjust the zoom ratio of the capture device 3 so that the whole of the document 2 can be captured at once. The adjustment of the capturing direction and the zoom ratio can be conducted correctly by letting the image acquisition control section 23 execute image analysis to image signals supplied from the capture device 3 and output the control signals so as to place four corners of the document 2 at four corners of the capturing area of the capture device 3, for example. Subsequently, the total image of the document 2 is acquired by the capture device 3 in the capturing direction and the zoom ratio which have been set by the image acquisition control section 23, and predetermined preprocessing (binarization etc.) is conducted to the acquired total image. The preprocessed total image is stored in the first image storage section 30 together with data concerning the capturing direction and the zoom ratio.

FIG. 3 is a schematic diagram showing a simple example of the total image of the document 2 which is acquired as above. The document 2 shown in FIG. 2 is composed of some paragraphs, and a figure and the text are laid out with relatively wide interspace.

<Step S2: Analyze Image Structure>

Subsequently, the control section 29 inputs the total image of the document 2 which has been stored in the first image storage section 30 to the structure analysis section 24 and thereby lets the structure analysis section 24 execute image structure analysis of the total image. The structure analysis section 24 extracts structural elements (pictures, texts, figures, etc.) of the document 2 from the total image, and obtains position information and attributes of the structural elements. The "attribute" means the type (character string, figure, picture, etc.) of the structural element. The extraction of the structural elements and their attribute decision can be carried out by the method described in a document: Noboru Nakajima, Keiji Yamada, and Jun Tsukumo "Document Layout Analysis by Extended Split Detection Method," Proceedings IAPR (International Association for Pattern Recognition) Workshop on Document Analysis Systems pp. 406–415 (1998). The position information includes, for example, the X-Y coordinates (in the horizontal plane) of the upper left-hand corner of the structural element and the length and breadth of the structural element in the X-Y plane. Thereafter, the control section 29 stores the attributes and the position information of the structural elements obtained by the structure analysis section 24 in the structure information storage section 32.

FIG. 4 is a schematic diagram showing an example of the definition of the position information of a structural element. The origin O of the X-Y coordinates shown in FIG. 4 is set at the barycenter of the capturing area 41 of the capture device 3 when the capturing direction ($\theta x$, $\theta y$) of the capture device 3 is set vertical ($\theta x=\theta x0=90°$, $\theta y=\theta y0=90°$). The distance between the capture device 3 and the top surface of the desk (on which the document 2 is placed) is constant and the capturing direction ($\theta x$, $\theta y$) and the zoom ratio of the capture device 3 when the total image of the document 2 was captured are known, therefore, the x-y position and the size (length and breadth) of the capturing area 42 of the capture device 3 when the total image was captured can be determined uniquely. Therefore, the position (the X-Y coordinates of the upper left-hand corner and the length and breadth) of a structural element 44 in the total image 43 of the document 2 can be obtained uniquely.

A structure analysis method (layout analysis) which is conducted to each sub-image in a document: Noboru Nakajima, Keiji Yamada, and Jun Tsukumo "Document Layout Analysis by Extended Split Detection Method," Proceedings IAPR (International Association for Pattern Recognition) Workshop on Document Analysis Systems pp. 406–415 (1998), can directly be used for the analysis which is conducted by the structure analysis section 24 of this embodiment. To explain the layout analysis briefly, an extended split detection method as a high speed recursive image segmentation method is conducted to the total image of the document 2 and thereby the total image of the document 2 is recursively segmented from a root node (the whole of the image) into leaf nodes (letters), thereby a closed area that is surrounded by pictures, texts, lines (field separators) and/or blank areas is extracted. Texture features are extracted from each area and the extracted texture features are inputted to a 3-layer perceptron, thereby the attribute ("picture", "figure", "character string", "field separator", etc.) of the area is determined as the output of the 3-layer perceptron.

Figure 5:
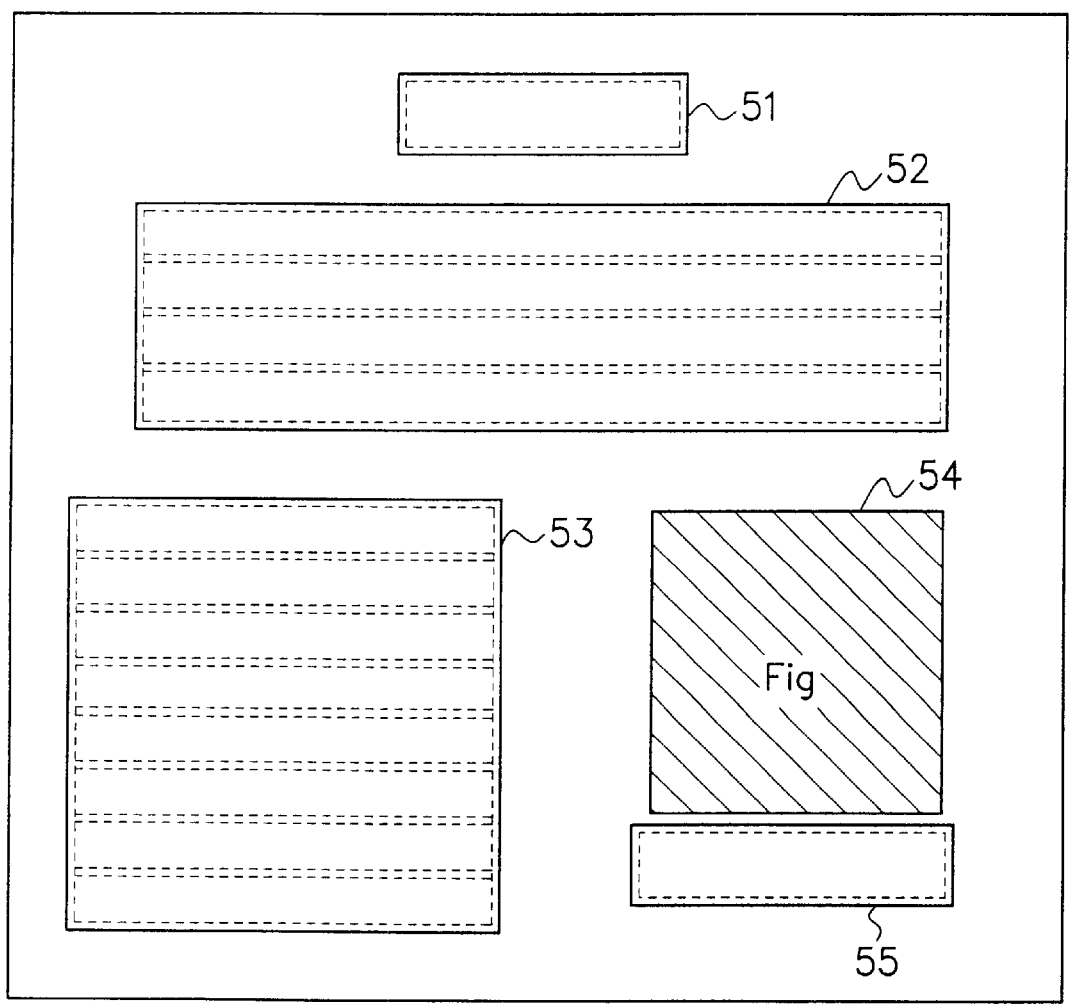
FIG. 5 is a schematic diagram showing an example of the result of structure analysis conducted to the total image of FIG. 3.

FIG. 5 is a schematic diagram showing an example of the result of the structure analysis conducted to the total image of FIG. 3. In the example of FIG. 5, position information and attributes concerning five structural elements 51 ~55 are obtained by the structure analysis. In FIG. 5, structural elements whose attributes are "character string" are surrounded by broken lines, and a structural element whose attribute is "figure (or image)" is diagonally shaded. <Step S3: Generate Control Information>

Subsequently, the control section 29 inputs the structure analysis results (attributes and position information of the structural elements which have been stored in the structure information storage section 32) to the control information generation section 25 and thereby lets the control information generation section 25 generate control information which is necessary for the capturing of sub-images (images of parts of the document 2). The control information generation section 25 first selects structural elements having attributes that require higher capturing resolution than that of the total image. The attributes requiring the higher capturing resolution have preliminarily been designated by the user by use of the input device 5, or have been preset to the system. For example, if the attributes requiring the higher capturing resolution include "character string" only, the structural elements 51, 52, 53 and 55 shown in FIG. 5 are selected by the control information generation section 25 and the structural element 54 is not selected.

Subsequently, the control information generation section 25 determines a zoom ratio for each structural element (51, 52, 53, 55) to be used for capturing sub-images of parts of the structural element. For example, the control information generation section 25 multiplies the original zoom ratio (which has been used for capturing the total image) by a predetermined number (×2, ×3, ..., for example) depending on the attribute of the structural element.

Subsequently, the control information generation section 25 determines the number of segmentation (the number of sub-images necessary for covering the whole of the structural element with the zoom ratio determined above) for each structural element, determines the capturing direction ($\theta x$, $\theta y$) for each sub-image, and determines the capturing order of the sub-images.

Figure 6A:
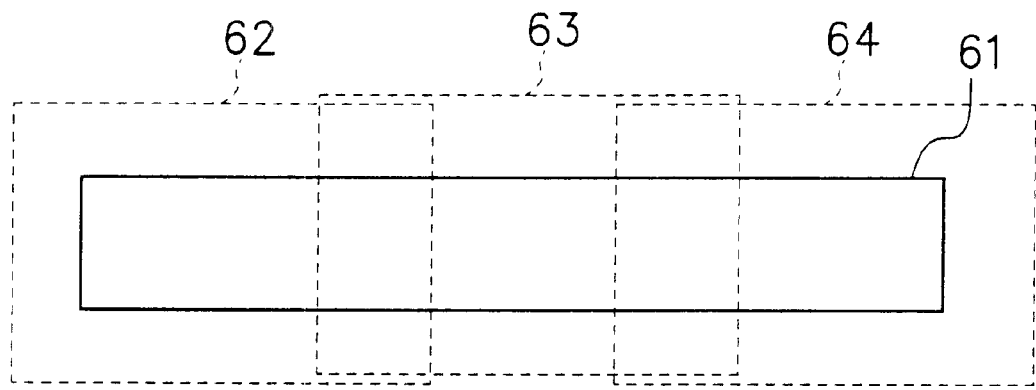
FIGS. 6A and 6B are schematic diagrams showing examples of structural element segmentation which is conducted by a control information generation section of the wide-area high-resolution image generation system of FIG. 1.
Figure 6B:
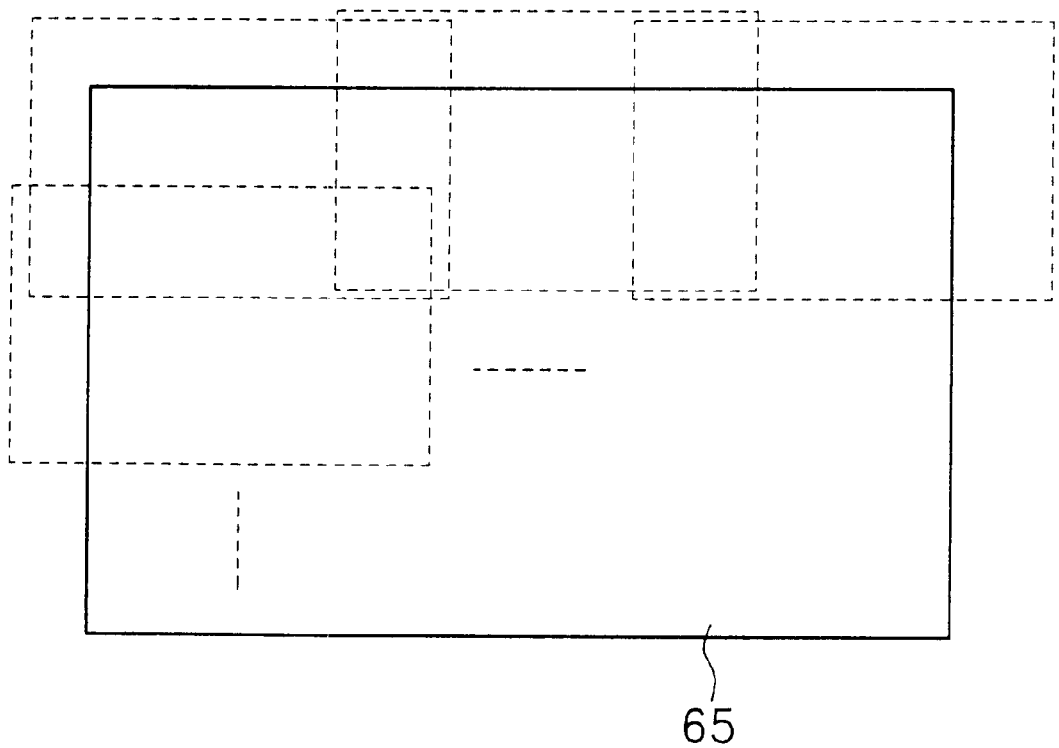

FIGS. 6A and 6B are schematic diagrams showing examples of the segmentation of the structural element which is conducted by the control information generation section 25. Referring to FIG. 6A, the size of a capturing area of the capture device 3 is determined by the zoom ratio which has been determined as above. When the capturing area has the size of a broken rectangle shown in FIG. 6A, the structural element 61 has to be segmented into three partial areas 62, 63 and 64, therefore, the control information generation section 25 determines capturing directions ($\theta x$, $\theta y$) in order to capture each of the three partial areas 62, 63 and 64, and determines the capturing order (partial area 62 → partial area 63 → partial area 64, for example).

Referring to FIG. 6B, when the length (height in FIG. 6B) of a structural element 65 is longer than that of the capturing area of the capture device 3, the control information generation section 25 segments the structural element 65 also in the longitudinal direction (2 stages, 3 stages, etc.). Also in this case, the control information generation section 25 determines the capturing direction ($\theta x$, $\theta y$) for each partial area and determines the capturing direction.

Incidentally, the control information generation section 25 sets the partial areas so that every two adjoining partial areas will overlap a little. The control information generation section 25 also sets the capturing order among the structural elements. Thereafter, the control section 29 stores the control information (capturing orders, capturing directions ($\theta x$, $\theta y$), etc.) generated by the control information generation section 25 in the control information storage section 33.

FIG. 7 is a table showing an example of the contents of the control information which is generated by the control information generation section 25 for the structural elements 51, 52, 53 and 55 of FIG. 5. In the example of FIG. 7, the structural elements 51, 52, 53 and 55 are segmented into m, n, p and q partial areas respectively, and the capturing directions ($\theta x$, $\theta y$) for the partial areas are stored in the order of capturing. The zoom ratio is also stored for each structural element in the example of FIG. 7. Incidentally, the control information of FIG. 7 excludes information concerning the structural element 54 since the attribute of the structural element 54 is "figure".

<Steps S4 ~S7>

The steps S4 ~S7 shown in FIG. 2 are conducted for each of the structural elements having attributes that require higher capturing resolution than that of the total image. For each of such structural elements, sub-images of the partial areas of the structural element are successively captured based on the control information generated by the control information generation section 25, and the captured sub-images are connected together, thereby a high resolution image of the structural element is generated. The processes which are conducted for the total image in the documents No. 1 and No. 2 can directly be employed for the steps S4 ~S7 which are conducted for each structural element. The steps S4 ~S7 will hereafter be explained briefly, taking the case of FIG. 7 as an example.

<Step S4: Select A Structural Element>

The control section 29 selects a structural element out of the structural elements based on the control information stored in the control information storage section 33. In the case of FIG. 7, the control section 29 first selects the structural element 51 at the front end of the table.

<Step S5: Acquire Sub-Images>

The control section 29 obtains the zoom ratio for the currently selected structural element 51 and the capturing direction ($\theta x$, $\theta y$) for the first partial area #1 of the structural element 51 from the control information, informs the image acquisition control section 23 about the zoom ratio and the capturing direction ($\theta x$, $\theta y$), and instructs the image acquisition control section 23 to acquire a sub-image of the first partial area #1 of the structural element 51. The image acquisition control section 23 sends a control signal (designating the capturing direction ($\theta x$, $\theta y$)) to the mechanical mount 7 via the signal line 9 and thereby adjusts the capturing direction of the capture device 3, and sends another control signal (designating the zoom ratio) to the capture device 3 via the signal line 8 and thereby adjusts the zoom ratio of the capture device 3. After the adjustment of the capturing direction ($\theta x$, $\theta y$) and the zoom ratio, the capture device 3 captures a sub-image of the document 2 according to an image capture instruction supplied from the image acquisition control section 23. Predetermined preprocessing (binarization etc.) is conducted to the acquired sub-image. The preprocessed sub-image is stored in the first image storage section 30 together with data concerning the capturing direction ($\theta x$, $\theta y$) and the zoom ratio. After the above process for the first partial area #1 of the structural element 51 is finished, the control section 29 repeats the same process for the partial areas #2 ~#m of the structural element 51, thereby sub-images of the partial areas #1 ~#m of the structural element 51 are stored in the first image storage section 30.

<Step S6: Connect Sub-Images>

Subsequently, the control section 29 reads the sub-images of the partial areas #1 ~#m of the structural element 51 from the first image storage section 30, inputs the sub-images to the image connection section 26, and thereby lets the image connection section 26 execute an image connection process. The image connection section 26 successively connects adjoining sub-images by use of image information of the sub-images, and thereby generates a high resolution image of the whole of the structural element 51. When the image connection method of the document No. 2 is employed, the image connection section 26 uses the structure analysis section 24 via the control section 29 and thereby obtains the positions of letters, character strings, etc. included in each sub-image. The image connection section 26 first roughly places adjoining two sub-images in registration (that is, roughly connects adjoining two sub-images) by use of common character strings that are included in both of the adjoining sub-images, and thereafter registers the two adjoining sub-images with sub-pixel accuracy by use of common letters which are included in both of the adjoining sub-images. The high resolution image of the structural element 51 which has been generated by the image connection process is stored by the control section 29 in the second image storage section 31.

<Step S7: Completed for all the Structural Elements?>

After the above process for the structural element 51 is finished, the control section 29 judges whether a structural element (having an attribute that requires higher capturing resolution than that of the total image) remaining in the table of FIG. 7 exists or not (whether the steps S4 ~S6 have been completed for all such structural elements or not). If a remaining structural element existed, the control section 29 repeats the above process (steps S4 ~S7) for the remaining structural element. In the example of FIG. 7, the above process (steps S4 ~S7) is repeated for the structural elements 52, 53 and 55, thereby high resolution images of the structural elements 51, 52, 53 and 55 are stored in the second image storage section 31.

<Step S8: Higher Resolution Capturing Necessary?>

Subsequently, the control section 29 activates the judgment section 27 and thereby lets the judgment section 27 judge whether or not a sufficient resolution could be attained for each structural element (whose high resolution image has been stored in the second image storage section 31). When the attribute of a structural element is "character string", the judgment section 27 judges that a sufficient resolution could be attained for a structural element if more than half of letters included in (extracted from) the structural element satisfy a pixel density (the number of pixels used for a letter: 60 pixels ×60 pixels, for example) which has preliminarily been determined by the user or the system, for example. It is also possible to let the judgment section 27 judge that a sufficient resolution could be attained if the smallest letter included in the structural element satisfy a predetermined pixel density. The current pixel density of each letter included in the structural element can be obtained by extracting each letter from the high resolution image which has been stored in the second image storage section 31. When the method of the aforementioned document No. 2 (in which structure information obtained by structure analysis of sub-images is used for the image connection process of the step S6) is employed, the extraction of letters from the high resolution image is done in the structure analysis, therefore, the pixel density of each letter can be obtained during the structure analysis and stored in the second image storage section 31 together with the synthesized high resolution image. In this case, the judgment section 27 refers to the pixel density stored in the second image storage section 31 for the judgment.

The following explanation will be given on the assumption that a sufficient resolution could be attained for the structural elements 51 and 55 only and the sufficient resolution could not be attained for the structural elements 52 and 53.

<Step S9: Regenerate Control Information>

The control section 29 reads out the structure analysis results of the structural elements 52 and 53 (whose resolution has been judged to be insufficient) from the structure information storage section 32, inputs the structure analysis results to the control information generation section 25, and instructs the control information generation section 25 to regenerate the control information which is necessary for capturing partial areas of the structural elements 52 and 53. The control information generation section 25 determines a new zoom ratio for each structural element (52, 53) to be used for capturing sub-images of parts of the structural element. For example, the control information generation section 25 multiplies the current zoom ratio (used for capturing the sub-images) by a predetermined number (×2, ×3, . . . , for example). The current zoom ratio has been stored in the control information storage section 33, and thus the control information generation section 25 reads out and uses the current zoom ratio for determining the new zoom ratio. It is also possible to let the judgment section 27 calculate average pixel density (of some letters whose resolution is insufficient) with regard to each of the structural elements whose resolution has been judged to be insufficient. In this case, the judgment section 27 determines a number (multiplier: ×2, ×3, etc.) by which the current zoom ratio should be multiplied for attaining the sufficient resolution (sufficient pixel density) based on the average pixel density and informs the control section 29 of the number (multiplier) together with the judgment result, and the control section 29 informs the control information generation section 25 of the number (multiplier).

Subsequently, the control information generation section 25 determines the number of segmentation (the number of sub-images necessary for covering the whole of the structural element with the (new) zoom ratio determined above) for each structural element (52, 53), determines the capturing direction ($\theta x$, $\theta y$) for each sub-image, and determines the capturing order of the sub-images. The control information generation section 25 also sets the capturing order between the structural elements 52 and 53. The control information generated above is basically similar to the control information for the structural elements 52 and 53 which has been shown in FIG. 7. However, the zoom ratio has been increased for the structural elements 52 and 53 and thereby the number of segmentation (the number of sub-images or the number of partial areas) becomes larger than the previous number (n, p). The regenerated control information for the structural elements 52 and 53 is supplied to the control section 29, and the control section 29 stores the control information (capturing orders, capturing directions ($\theta x$, $\theta y$), etc.) regenerated by the control information generation section 25 in the control information storage section 33 as second control information.

<Steps S10 ~S13>

The steps S10 ~S13 shown in FIG. 2 are conducted for each of the structural elements 52 and 53 which require the still higher capturing resolution. For each of the structural elements 52 and 53, sub-images of the partial areas of the structural element are successively captured based on the control information (second control information) regenerated by the control information generation section 25, and the captured sub-images are connected together, thereby an image of the structural element having a higher resolution is generated.

<Step S10: Select A Structural Element>

The control section 29 selects a structural element out of the structural elements 52 and 53 based on the second control information stored in the control information storage section 33. For example, the control section 29 first selects the structural element 52 at the front end of the second control information.

<Step S11: Acquire Sub-Images>

The control section 29 obtains the zoom ratio for the currently selected structural element 52 and the capturing direction ($\theta x$, $\theta y$) for the first partial area #1 of the structural element 52 from the second control information, informs the image acquisition control section 23 about the zoom ratio and the capturing direction ($\theta x$, $\theta y$), and instructs the image acquisition control section 23 to acquire a sub-image of the first partial area #1 of the structural element 52. The image acquisition control section 23 sends a control signal (designating the capturing direction ($\theta x$, $\theta y$)) to the mechanical mount 7 via the signal line 9 and thereby adjusts the capturing direction of the capture device 3, and sends another control signal (designating the zoom ratio) to the capture device 3 via the signal line 8 and thereby adjusts the zoom ratio of the capture device 3. After the adjustment of the capturing direction ($\theta x$, $\theta y$) and the zoom ratio, the capture device 3 captures a sub-image according to an image capture instruction supplied from the image acquisition control section 23. Predetermined preprocessing (binarization etc.) is conducted to the acquired sub-image. The preprocessed sub-image is stored in the first image storage section 30 together with data concerning the capturing direction ($\theta x$, $\theta y$) and the zoom ratio. After the above process for the first partial area #1 of the structural element 52 is finished, the control section 29 repeats the same process for the partial areas #2 ~#m' (m'>m) of the structural element 52, thereby sub-images of the partial areas #1 ~#m' of the structural element 52 are stored in the first image storage section 30.

<Step S12: Connect Sub-Images>

Subsequently, the control section 29 reads the sub-images of the partial areas #1 ~#m' of the structural element 52 from the first image storage section 30, inputs the sub-images to the image connection section 26, and thereby lets the image connection section 26 execute an image connection process. The image connection section 26 successively connects adjoining sub-images by use of image information of the sub-images similarly to the image connection process of the step S6, and thereby generates an image of the whole of the structural element 52 having a higher resolution. The control section 29 replaces the high resolution image of the structural element 52 which has been stored in the second image storage section 31 with the higher resolution image of the structural element 52 generated by the above image connection process of the step S12.

<Step S13: Completed for all the Structural Elements?>

After the above process for the structural element 52 is finished, the control section 29 judges whether or not a remaining structural element exists in the second control information. If a remaining structural element existed, the control section 29 repeats the above process (steps S10 ~S13) for the remaining structural element. In this example, the above process (steps S10 ~S13) is repeated for the structural element 53. Consequently, the high resolution images of the structural elements 52 and 53 which have been stored in the second image storage section 31 are replaced with the higher resolution images (second high resolution images) regenerated by the above processes.

After the processes based on the second control information are finished, the control section 29 returns to the step S8 and activates the judgment section 27 again and thereby lets the judgment section 27 judge whether or not a sufficient resolution could be attained for each structural element (whose second high resolution image has been stored in the second image storage section 31). If there is a structural element whose resolution is still insufficient ("No" in the step S8), the control section 29 repeats the above process for the structural element until the sufficient resolution can be attained. If the sufficient resolution could be attained for each structural element ("Yes" in the step S8), the final step S14 is executed.

<Steps S14: Reconstruct Total Image>

In the final step S14, the total image of the document 2 is reconstructed by synthesizing the images of the structural elements of the document 2 maintaining the relative position relationship between the structural elements. Concretely, the control section 29 reads out the structure analysis result of the document 2 from the structure information storage section 32 and inputs the structure analysis result to the image reconstruction section 28. Meanwhile, if a high resolution image has already been stored in the second image storage section 31 for a structural element, the control section 29 reads out the high resolution image of the structural element from the second image storage section 31 and inputs the high resolution image to the image reconstruction section 28. If no high resolution image has been stored in the second image storage section 31 for a structural element, the control section 29 extracts a sub-image corresponding to the structural element from the total image of the document 2 which has been acquired in the step S1 and stored in the first image storage section 30, and inputs the extracted sub-image to the image reconstruction section 28. The image reconstruction section 28 recognizes relative positions of the structural elements in the document 2 based on the position information of the structural elements included in the structure analysis result, synthesizes the images (the high resolution images and/or the extracted sub-images) of the structural elements maintaining the relative positions of the structural elements, and thereby reconstructs a total image of the document 2. Thereafter, the control section 29 outputs the reconstructed total image to the output device 6 via the output section 22. Incidentally, it is also possible to let the control section 29 store the reconstructed total image in an unshown storage device etc. or input the reconstructed total image to a character recognition program etc., instead of outputting the reconstructed total image to the output device 6.

In this example, the low resolution image of the structural element 54 extracted from the total image acquired in the step S1, the high resolution images of the structural elements 51 and 55 which have been generated in the image connection process of the step S6, and the (second) high resolution images of the structural elements 52 and 53 which have been generated in the image connection process of the step S12 are synthesized based on the position information of the structural elements obtained in the image structure analysis of the step S2 so that relative position relationship of the images in the synthesized image (reconstructed total image) will be the same as that of the structural elements in the total image, and thereby the reconstructed total image of the document 2 is obtained. The size (the number of pixels) of an image of a structural element generally changes depending on the capturing resolution (that is, the number of pixels used for capturing a unit area of the document 2), therefore, if we assume the highest capturing resolution among the structural elements 51 ~55 is P, an image of a structural element captured with a resolution Q is magnified by P/Q and thereby the sizes of the images of the structural elements are adjusted to be proportional to the sizes of the structural elements in the document 2.

Incidentally, while the zoom ratio for each structural element having an attribute "character string" was automatically adjusted so that the pixel density of letters included in the structural element will be a predetermined pixel density or more in the above example, it is also possible to let the user designate and input a final zoom ratio or resolution for each attribute ("character": 400 dpi, "photograph": 100 dpi, for example) through the input device 5. In this case, in the step S3 of FIG. 2, a judgment (on whether or not the zoom ratio or resolution used in the step S1 is smaller than the zoom ratio or resolution designated by the user) is conducted for each structural element, and if smaller, the control information for the structural element is generated based on the zoom ratio or resolution designated by the user. In this case, when the control section 29 judged in the step S7 that no remaining structural element exists, the total image reconstruction process of the step S14 is conducted immediately without executing the judgment of the step S8 and the following steps S9~S13.

While the whole of the document 2 was captured in a frame and thereby the total image of the document 2 was acquired in the step S1, it is also possible to capture the document 2 in several (2~4, for example) frames or images and generate the total image of the document 2 by letting the image connection section 26 connect the several images in the step S1.

The capture device 3 is not limited to the camera (active camera, pan-tilt-zoom camera, etc.) which is held by the mechanical mount 7 so as to face the document 2 placed on a desk. Other types of devices such as a flatbed scanner can also be used as the capture device 3.

The target object of image capturing is not limited to a document 2. For example, the target object can be a picture, one or more three-dimensional objects (such as blocks), etc. In the case where three-dimensional objects are the target object of image capturing, the image connection process (step S6, step S12) can be conducted by use of structural information (edges etc.) included in sub-images.

[Embodiment 2]

Figure 8:
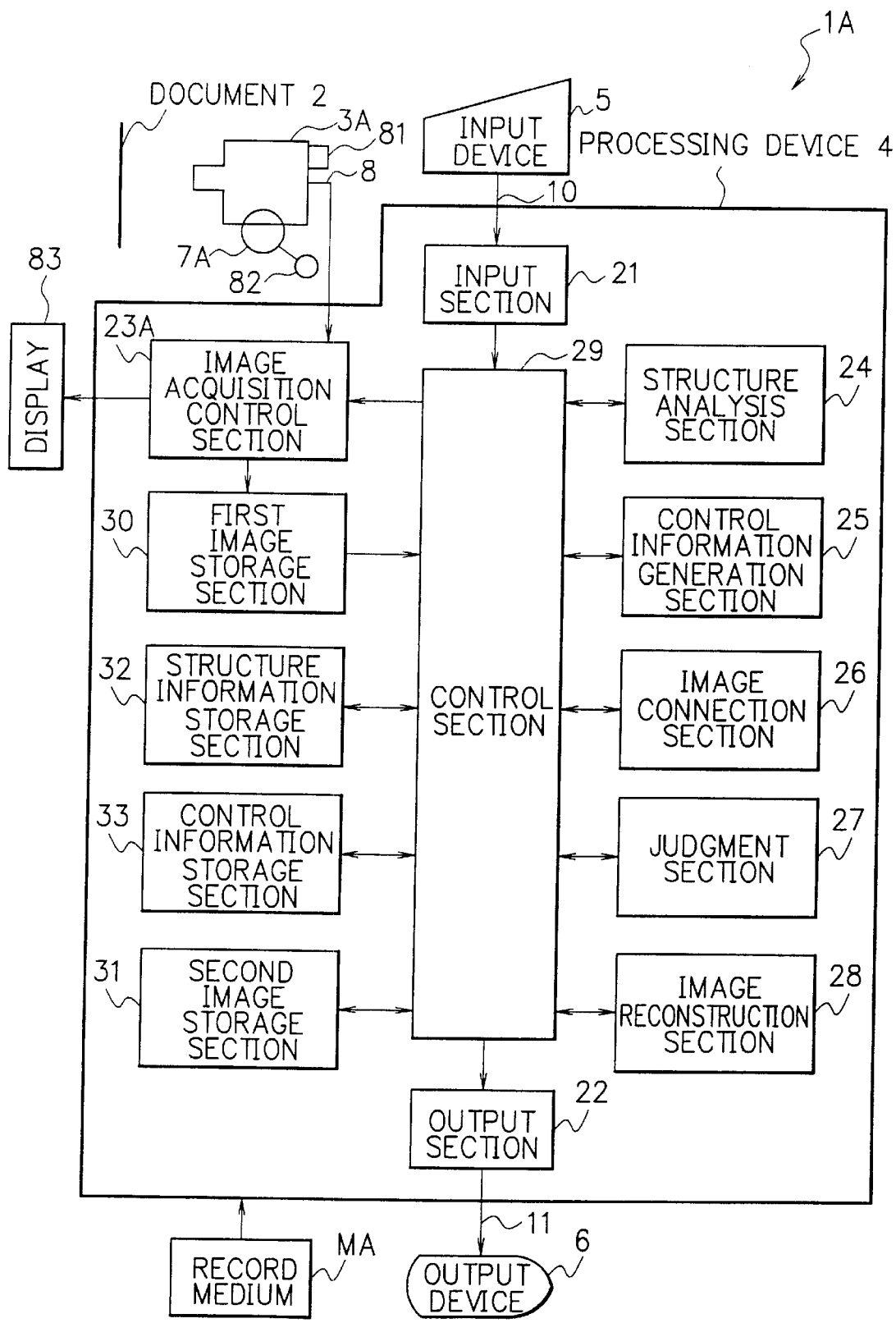
FIG. 8 is a block diagram showing a wide-area high-resolution image generation system in accordance with a second embodiment of the present invention.

FIG. 8 is a block diagram showing a wide-area high-resolution image generation system in accordance with a second embodiment of the present invention. In the wide-area high-resolution image generation system 1A of the second embodiment, the zoom ratio and the capturing direction ($\theta x$, $\theta y$) of a capture device 3A is adjusted manually by the user, differently from the wide-area high-resolution image generation system 1 of the first embodiment.

Referring to FIG. 8, the capture device 3A has a zoom ratio control knob 81. The user turns the zoom ratio control knob 81 and thereby sets the zoom ratio of the capture device 3A arbitrarily. The capture device 3A is attached to a mechanical mount 7A and is held so as to face the document 2 which is placed on a desk, in the same way as the capture device 3 of the first embodiment. The mechanical mount 7A rotates the capture device 3A around two orthogonal horizontal axes (x-axis and y-axis) similarly to the mechanical mount 7 of the first embodiment, however, the mechanical mount 7A of the second embodiment is manually operated by the user. Therefore, the capturing direction ($\theta x$, $\theta y$) of the capture device 3A is adjusted by the manual operation of the mechanical mount 7A by the user. The mechanical mount 7A is provided with a capturing direction indicator 82 (protractor etc.) which measures and indicates the current capturing direction ($\theta x$, $\theta y$) of the capture device 3A. The capturing direction indicator 82 indicates the capturing direction in terms of a displacement angle $\theta x$ from the x-axis and a displacement angle $\theta y$ from the y-axis. The capturing direction ($\theta x$, $\theta y$) measured by the capturing direction indicator 82 is inputted to the image acquisition control section 23A. The current zoom ratio of the capture device 3A is also inputted to the image acquisition control section 23A. A display 83 which is connected to the image acquisition control section 23A displays the current capturing direction ($\theta x$, $\theta y$) and zoom ratio of the capture device 3A to the user.

The operation of the wide-area high-resolution image generation system 1A of the second embodiment is basically the same as the wide-area high-resolution image generation system 1 of the first embodiment, except that the zoom ratio and the capturing direction (θx, θy) of the capture device 3A are manually adjusted by the user. In the following, the operation of the wide-area high-resolution image generation system 1A will be explained mainly on the difference from the first embodiment.

For the acquisition of the total image in the step S1 of FIG. 2, a message such as "Please adjust capturing direction and zoom ratio for capturing the document in a frame." is displayed on the display 83 by the image acquisition control section 23A, for example. The user who saw the message adjusts the zoom ratio by manipulating the zoom ratio control knob 81 and adjusts the capturing direction (θx, θy) by operating the mechanical mount 7A so as to fit the whole of the document 2 into a frame. When the adjustment of the zoom ratio and the capturing direction (θx, θy) is finished, the user inputs an instruction for starting image capturing from the input device 5, and the instruction is transferred to the image acquisition control section 23A via the input section 21 and the control section 29. The image acquisition control section 23A which received the image capturing instruction of the user instructs the capture device 3A to acquire an image of the document 2, and stores the acquired image (total image of the document 2) in the first image storage section 30 together with the current capturing direction (θx, θy) and zoom ratio. Thereafter, the image structure analysis of the step S2 and the control information generation of the step S3 are executed in the same way as the first embodiment.

For the acquisition of sub-images of partial areas of a structural element in the step S5 of FIG. 2, a message such as "Please adjust zoom ratio to * * and capturing direction (θx, θy) to (* *, * *)." is displayed on the display 83 by the image acquisition control section 23A according to the contents of the control information of FIG. 7, for example. The user who saw the message adjusts the zoom ratio to the designated zoom ratio * * by manipulating the zoom ratio control knob 81 and adjusts the capturing direction (θx, θy) to the designated capturing direction (* *, * *) by operating the mechanical mount 7A. When the adjustment of the zoom ratio and the capturing direction (θx, θy) is finished, the user inputs another image capturing instruction from the input device 5, and the instruction is transferred to the image acquisition control section 23A via the input section 21 and the control section 29. The image acquisition control section 23A which received the image capturing instruction of the user instructs the capture device 3A to acquire an image of the document 2 (that is, a sub-image of the partial area of the structural element), and stores the acquired sub-image in the first image storage section 30 together with the current capturing direction (θx, θy) and zoom ratio. The sub-image acquisition of the step S11 is also executed similarly.

The reference character "MA" shown in FIG. 8 denotes a machine-readable record medium (CD-ROM, semiconductor memory, magnetic disk, etc). A wide-area high-resolution image generation program which has been stored in the record medium MA is read out by a computer and controls the operation of the computer, thereby a function section (the input section 21, the output section 22, the image acquisition control section 23A, the structure analysis section 24, the control information generation section 25, the image connection section 26, the judgment section 27, the image reconstruction section 28 and the control section 29) and a storage section (the first image storage section 30, the second image storage section 31, the structure information storage section 32 and the control information storage section 33) of the processing device 4 are implemented on the computer.

[Embodiment 3]

In the following, a third embodiment in accordance with the present invention will be explained in detail. In the third embodiment, geometrical deformation of each sub-image caused by the image capturing by the capture device 3 is estimated, and the sub-images are connected together in the image connection processes of the steps S6 and S12 after compensating for the geometrical deformation.

A concrete method for the geometrical deformation estimation has been disclosed in a document: S. Mann and R. W. Picard "Video orbits of the projective group: A simple approach to featureless estimation of parameters," IEEE Transactions on Image Processing, Vol. 6, No. 9, pp. 1281–1295 (1995).

In the third embodiment, geometrical deformation parameters indicating geometrical deformation between two adjoining sub-images are estimated basically according to the method of the above document. The geometrical deformation parameters are obtained for every two adjoining sub-images. When a sub-image S1 that adjoins a sub-image S0 is connected to the sub-image S0 in the image connection process of the step S6 or the step S12, the sub-image S1 is reversely deformed (that is, the geometrical deformation of the sub-image S1 relative to the sub-image S0 is compensated for) by use of the geometrical deformation parameters between the sub-images S0 and S1 (hereafter, referred to as "geometrical deformation parameters of the sub-image S1 (relative to the sub-image S0)"). When a sub-image S2 that adjoins the sub-image S1 is connected to the "current image" (composed of the sub-image S0 and the reversely deformed sub-image S1 which have been connected together), geometrical deformation parameters between the sub-images S0 and S2 (hereafter, referred to as "geometrical deformation parameters of the sub-image S2 (relative to the sub-image S0)") are obtained based on the geometrical deformation parameters between the sub-images S0 and S1 (geometrical deformation parameters of the sub-image S1 relative to the sub-image S0) and the geometrical deformation parameters between the sub-images S1 and S2. The sub-image S2 to be connected to the "current image" is reversely deformed (that is, the geometrical deformation of the sub-image S2 relative to the sub-image S0 is compensated for) by use of the geometrical deformation parameters of the sub-image S2 relative to the sub-image S0, and the reversely deformed sub-image S2 is connected to the "current image". Other sub-images are successively connected to the "current image" in similar ways.

However, if the geometrical deformation estimation method of the above document is directly used for calculating the geometrical deformation parameters between adjoining sub-images, enormous amounts (proportional to the number of pixels) of calculations (operations of high-order matrices whose elements are obtained from observed values based on differential calculus throughout the whole sub-image pixels) are required, and thereby a long calculation time becomes necessary for the geometrical deformation estimation.

In order to resolve the above problems, in the third embodiment, pixels that are used for the geometrical deformation estimation are limited and thereby the amount of calculations is decreased and calculation speed is increased.

In this embodiment, in the estimation of the geometrical deformation parameters between two adjoining sub-images, one or more fine structural elements (smaller structural elements such as letters) included in both of the two adjoining sub-images are extracted from the two adjoining sub-images, and the geometrical deformation parameters between the two adjoining sub-images is estimated using the extracted fine structural elements, thereby the amount of necessary calculations is reduced and the calculation speed is increased.

It is also possible to use the letters which have already been extracted from the sub-images in the resolution judgment process of the step S8 as the above fine structural elements, thereby processing time necessary for the geometrical deformation estimation can be reduced further.

The estimation of the geometrical deformation parameters between two adjoining sub-images can also be done differently, by estimating geometrical deformation parameters of each of one or more fine structural elements between the two adjoining sub-images individually and taking the average of the geometrical deformation parameters of the fine structural elements. Also in this case, the amount of necessary calculations can be reduced and the calculation speed can be increased.

As set forth hereinabove, in the wide-area high-resolution image generation system and the wide-area high-resolution image generation method in accordance with the present invention, a wide-area high-resolution image of a target object (document 2, etc.) can be generated successfully even if a relatively large blank area existed in the target object or in the originally captured total image. Structural elements (text, figure, picture, etc.) are extracted from the total image by means of the image structure analysis of the step S2. For each of one or more selected structural elements (having attributes requiring high resolution capturing, for example), the sub-image acquisition process (step S5 or S11) and the image connection process (step S6 or S12) are conducted individually and thereby an image (synthesis target image) to be synthesized in the step S14 is obtained. For each of the other (not selected) structural elements, part of the total image corresponding to the structural element is extracted from the total image as a synthesis target image. In the total image reconstruction process of the step S14, the synthesis target images of the structural elements are synthesized so that relative position relationship of the synthesis target images will be the same as that of the structural elements in the total image based on the position information of the structural elements obtained in the image structure analysis of the step S2. Therefore, the wide-area high-resolution image of the target object can be obtained successfully even if a relatively large blank area existed in the target object or in the originally captured total image.

Further, the wide-area high-resolution image can be generated by use of images of different resolutions. In the wide-area high-resolution image generation system and the wide-area high-resolution image generation method in accordance with the present invention, images (synthesis target images) of the structural elements having various resolutions are prepared and synthesized and thereby the wide-area high-resolution image is generated. The sub-images to be connected together in the image connection process of the steps S6 or S12 are sub-images of partial areas included in the same structural element, and sub-images of partial areas of different structural elements are not connected together. Therefore, no problem occurs even if the resolution changed between the structural elements, and the resolution can be set individually for each structural element.

Further, when one or more areas (such as blank areas) that do not require high resolution capturing existed in the originally captured total image, the number of necessary sub-images can be decreased and the processing time can be shortened, since the capturing of sub-images is not executed for the areas (such as blank areas) that do not require high resolution capturing.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A wide-area high-resolution image generation method comprising the steps of:

a total image acquisition step in which a target object of the generation of a wide-area high-resolution image is captured by a capture device and thereby a total image of the target object is acquired;

an image structure analysis step in which image structure analysis is conducted to the total image of the target object and thereby structural elements are extracted from the total image and position information of each structural element is obtained;

a sub-image acquisition step which is conducted for one or more of the structural elements, in which one or more partial areas and a resolution to be used for capturing the structural element are determined and sub-images of the partial areas of the structural element are acquired by the capture device with the determined resolution;

an image connection step which is conducted for each of the structural elements to which the sub-image acquisition step has been conducted, in which the sub-images of the partial areas of the structural element are connected together by use of image information of the sub-images and thereby an image of the structural element having the determined resolution is obtained as a synthesis target image;

an image extraction step which is conducted for each of the structural elements to which the sub-image acquisition step has not been conducted, in which part of the total image corresponding to the structural element is extracted from the total image as a synthesis target image; and a wide-area high-resolution image generation step in which the synthesis target images of the structural elements obtained in the image connection steps and the image extraction steps are synthesized so that relative position relationship of the synthesis target images will be the same as that of the structural elements in the total image of the target object based on the position information of the structural elements obtained in the image structure analysis step and thereby a wide-area high-resolution image of the target object is obtained.

2. A wide-area high-resolution image generation method as claimed in claim 1, wherein the wide-area high-resolution image generation method further comprises an attribute determination step in which the attribute of each structural element is determined based on the image structure analysis, and the sub-image acquisition step is conducted for structural elements having attributes that require higher resolution than that of the total image.

3. A wide-area high-resolution image generation method as claimed in claim 2, wherein:

the wide-area high-resolution image generation method further comprises a resolution judgment step which is conducted for each of the structural elements to which the sub-image acquisition step has been conducted, in which whether or not a sufficient resolution predetermined for the attribute of the structural element could be attained is judged, and the sub-image acquisition step is repeated with a higher resolution and new partial areas for each of the structural elements that have been judged to have insufficient resolution in the resolution judgment step, until the sufficient resolution predetermined for the attribute is attained, and the image connection step for the structural element is conducted by use of the sub-images which attained the sufficient resolution.

4. A wide-area high-resolution image generation method as claimed in claim 3, wherein in the resolution judgment step, one or more fine structural elements are extracted from the sub-images of the structural element and the judgment on the resolution is executed based on pixel density of the extracted fine structural elements.

5. A wide-area high-resolution image generation method as claimed in claim 4, wherein one or more letters are extracted as the fine structural elements in the resolution judgment step.

6. A wide-area high-resolution image generation method as claimed in claim 1, further comprising:

a geometrical deformation estimation step in which geometrical deformation is estimated between every two adjoining sub-images of a structural element and thereby geometrical deformation of each sub-image of the structural element is estimated; and a geometrical deformation compensation step in which the geometrical deformation of each sub-image of the structural element is compensated for based on the geometrical deformation estimated in the geometrical deformation estimation step and thereby deformation-compensated sub-images of the structural element are obtained to be used in the image connection step.

7. A wide-area high-resolution image generation method as claimed in claim 6, wherein in the geometrical deformation estimation step, the estimation of the geometrical deformation between two adjoining sub-images is conducted using one or more fine structural elements extracted from the two adjoining sub-images.

8. A wide-area high-resolution image generation method as claimed in claim 7, wherein in the geometrical deformation estimation step, one or more letters extracted from the two adjoining sub-images are used as the fine structural elements.

9. A wide-area high-resolution image generation method as claimed in claim 7, wherein in the geometrical deformation estimation step, the estimation of the geometrical deformation between the two adjoining sub-images is conducted by estimating geometrical deformation of each of one or more fine structural elements between the two adjoining sub-images individually and taking the average of the geometrical deformations of the fine structural elements.

10. A wide-area high-resolution image generation method as claimed in claim 4, wherein:

the wide-area high-resolution image generation method further comprises:

a geometrical deformation estimation step in which geometrical deformation is estimated between every two adjoining sub-images of a structural element and thereby geometrical deformation of each sub-image of the structural element is estimated; and a geometrical deformation compensation step in which the geometrical deformation of each sub-image of the structural element is compensated for based on the geometrical deformation estimated in the geometrical deformation estimation step and thereby deformation-compensated sub-images of the structural element are obtained to be used in the image connection step, and in the geometrical deformation estimation step, the estimation of the geometrical deformation between two adjoining sub-images is conducted using the fine structural elements extracted in the resolution judgment step.

11. A wide-area high-resolution image generation system comprising a processing device which is connected to a capture device whose capturing direction and zoom ratio are controllable, wherein the processing device includes:

a total image acquisition means for capturing a target object of the generation of a wide-area high-resolution image by use of the capture device and thereby acquiring a total image of the target object;

an image structure analysis means for conducting image structure analysis to the total image of the target object and thereby extracting structural elements from the total image and obtaining position information of each structural element;

a sub-image acquisition means which conducts a sub-image acquisition process for one or more of the structural elements, in which one or more partial areas and a resolution to be used for capturing the structural element are determined and sub-images of the partial areas of the structural element are acquired by the capture device with the determined resolution;

an image connection means which conducts an image connection process for each of the structural elements to which the sub-image acquisition process has been conducted, in which the sub-images of the partial areas of the structural element are connected together by use of image information of the sub-images and thereby an image of the structural element having the determined resolution is obtained as a synthesis target image;

an image extraction means which conducts an image extraction process for each of the structural elements to which the sub-image acquisition process has not been conducted, in which part of the total image corresponding to the structural element is extracted from the total image as a synthesis target image; and a wide-area high-resolution image generation means for synthesizing the synthesis target images of the structural elements obtained in the image connection process and the image extraction process so that relative position relationship of the synthesis target images will be the same as that of the structural elements in the total image of the target object based on the position information of the structural elements obtained by the image structure analysis means and thereby obtaining a wide-area high-resolution image of the target object.

12. A wide-area high-resolution image generation system as claimed in claim 11, wherein:

the processing device further includes an attribute determination means for determining the attribute of each structural element based on the image structure analysis conducted by the image structure analysis means, and the sub-image acquisition means conducts the sub-image acquisition process for structural elements having attributes that require higher resolution than that of the total image.

13. A wide-area high-resolution image generation system as claimed in claim 12, wherein:

the processing device further includes a resolution judgment means which conducts a resolution judgment process for each of the structural elements to which the sub-image acquisition process has been conducted, in which whether or not a sufficient resolution predetermined for the attribute of the structural element could be attained is judged, and the sub-image acquisition means repeats the sub-image acquisition process with a higher resolution and new partial areas for each of the structural elements that have been judged to have insufficient resolution in the resolution judgment process, until the sufficient resolution predetermined for the attribute is attained, and the image connection means conducts the image connection process for the structural element by use of the sub-images which attained the sufficient resolution.

14. A wide-area high-resolution image generation system as claimed in claim 13, wherein the resolution judgment means extracts one or more fine structural elements from the sub-images of the structural element and executes the judgment on the resolution based on pixel density of the extracted fine structural elements.

15. A wide-area high-resolution image generation system as claimed in claim 14, wherein the resolution judgment means extracts one or more letters as the fine structural elements.

16. A wide-area high-resolution image generation system as claimed in claim 11, wherein the processing device further includes:

a geometrical deformation estimation means for estimating geometrical deformation between every two adjoining sub-images of a structural element and thereby estimating geometrical deformation of each sub-image of the structural element; and a geometrical deformation compensation means for compensating for the geometrical deformation of each sub-image of the structural element based on the geometrical deformation estimated by the geometrical deformation estimation means and thereby obtaining deformation-compensated sub-images of the structural element to be used in the image connection process.

17. A wide-area high-resolution image generation system as claimed in claim 16, wherein the geometrical deformation estimation means conducts the estimation of the geometrical deformation between two adjoining sub-images using one or more fine structural elements extracted from the two adjoining sub-images.

18. A wide-area high-resolution image generation system as claimed in claim 17, wherein the geometrical deformation estimation means uses one or more letters extracted from the two adjoining sub-images as the fine structural elements.

19. A wide-area high-resolution image generation system as claimed in claim 17, wherein the geometrical deformation estimation means conducts the estimation of the geometrical deformation between the two adjoining sub-images by estimating geometrical deformation of each of one or more fine structural elements between the two adjoining sub-images individually and taking the average of the geometrical deformations of the fine structural elements.

20. A wide-area high-resolution image generation system as claimed in claim 14, wherein:

the processing device further includes:

a geometrical deformation estimation means for estimating geometrical deformation between every two adjoining sub-images of a structural element and thereby estimating geometrical deformation of each sub-image of the structural element; and a geometrical deformation compensation means for compensating for the geometrical deformation of each sub-image of the structural element based on the geometrical deformation estimated by the geometrical deformation estimation means and thereby obtaining deformation-compensated sub-images of the structural element to be used in the image connection process, and the geometrical deformation estimation means conducts the estimation of the geometrical deformation between two adjoining sub-images using the fine structural elements extracted by the resolution judgment means.

21. A machine-readable record medium storing a program for instructing a computer, a DSP (Digital Signal Processor), etc. to execute a wide-area high-resolution image generation process, wherein the wide-area high-resolution image generation process comprises the steps of:

a total image acquisition step in which a target object of the generation of a wide-area high-resolution image is captured by a capture device and thereby a total image of the target object is acquired;

an image structure analysis step in which image structure analysis is conducted to the total image of the target object and thereby structural elements are extracted from the total image and position information of each structural element is obtained;

a sub-image acquisition step which is conducted for one or more of the structural elements, in which one or more partial areas and a resolution to be used for capturing the structural element are determined and sub-images of the partial areas of the structural element are acquired by the capture device with the determined resolution;

an image connection step which is conducted for each of the structural elements to which the sub-image acquisition step has been conducted, in which the sub-images of the partial areas of the structural element are connected together by use of image information of the sub-images and thereby an image of the structural element having the determined resolution is obtained as a synthesis target image;

an image extraction step which is conducted for each of the structural elements to which the sub-image acquisition step has not been conducted, in which part of the total image corresponding to the structural element is extracted from the total image as a synthesis target image; and a wide-area high-resolution image generation step in which the synthesis target images of the structural elements obtained in the image connection steps and the image extraction steps are synthesized so that relative position relationship of the synthesis target images will be the same as that of the structural elements in the total image of the target object based on the position information of the structural elements obtained in the image structure analysis step and thereby a wide-area high-resolution image of the target object is obtained.

22. A machine-readable record medium as claimed in claim 21, wherein the wide-area high-resolution image generation process further comprises an attribute determination step in which the attribute of each structural element is determined based on the image structure analysis, and the sub-image acquisition step is conducted for structural elements having attributes that require higher resolution than that of the total image.

23. A machine-readable record medium as claimed in claim 22, wherein:

the wide-area high-resolution image generation process further comprises a resolution judgment step which is conducted for each of the structural elements to which the sub-image acquisition step has been conducted, in which whether or not a sufficient resolution predetermined for the attribute of the structural element could be attained is judged, and the sub-image acquisition step is repeated with a higher resolution and new partial areas for each of the structural elements that have been judged to have insufficient resolution in the resolution judgment step, until the sufficient resolution predetermined for the attribute is attained, and the image connection step for the structural element is conducted by use of the sub-images which attained the sufficient resolution.

24. A machine-readable record medium as claimed in claim 23, wherein in the resolution judgment step, one or more fine structural elements are extracted from the sub-images of the structural element and the judgment on the resolution is executed based on pixel density of the extracted fine structural elements.

25. A machine-readable record medium as claimed in claim 24, wherein one or more letters are extracted as the fine structural elements in the resolution judgment step.

26. A machine-readable record medium as claimed in claim 21, wherein the wide-area high-resolution image generation process further comprises:

a geometrical deformation estimation step in which geometrical deformation is estimated between every two adjoining sub-images of a structural element and thereby geometrical deformation of each sub-image of the structural element is estimated; and a geometrical deformation compensation step in which the geometrical deformation of each sub-image of the structural element is compensated for based on the geometrical deformation estimated in the geometrical deformation estimation step and thereby deformation-compensated sub-images of the structural element are obtained to be used in the image connection step.

27. A machine-readable record medium as claimed in claim 26, wherein in the geometrical deformation estimation step, the estimation of the geometrical deformation between two adjoining sub-images is conducted using one or more fine structural elements extracted from the two adjoining sub-images.

28. A machine-readable record medium as claimed in claim 27, wherein in the geometrical deformation estimation step, one or more letters extracted from the two adjoining sub-images are used as the fine structural elements.

29. A machine-readable record medium as claimed in claim 27, wherein in the geometrical deformation estimation step, the estimation of the geometrical deformation between the two adjoining sub-images is conducted by estimating geometrical deformation of each of one or more fine structural elements between the two adjoining sub-images individually and taking the average of the geometrical deformations of the fine structural elements.

30. A machine-readable record medium as claimed in claim 24, wherein:

the wide-area high-resolution image generation process further comprises:

a geometrical deformation estimation step in which geometrical deformation is estimated between every two adjoining sub-images of a structural element and thereby geometrical deformation of each sub-image of the structural element is estimated; and a geometrical deformation compensation step in which the geometrical deformation of each sub-image of the structural element is compensated for based on the geometrical deformation estimated in the geometrical deformation estimation step and thereby deformation-compensated sub-images of the structural element are obtained to be used in the image connection step, and in the geometrical deformation estimation step, the estimation of the geometrical deformation between two adjoining sub-images is conducted using the fine structural elements extracted in the resolution judgment step.

* * * * *